(12) United States Patent
Vanko et al.

(10) Patent No.: US 11,770,048 B2
(45) Date of Patent: Sep. 26, 2023

(54) HANDHELD POWER TOOL WITH A BRUSHLESS ELECTRIC MOTOR

(71) Applicant: Black & Decker Inc., New Britain, CT (US)

(72) Inventors: John C. Vanko, Timonium, MD (US); Michael K. Forster, White Hall, MD (US); Matthew J. Velderman, Baltimore, MD (US); John Howson, Sparks, MD (US)

(73) Assignee: BLACK & DECKER, INC., New Britain, CT (US)

( * ) Notice: Subject to any disclaimer, the term of this patent is extended or adjusted under 35 U.S.C. 154(b) by 0 days.

(21) Appl. No.: 17/521,250

(22) Filed: Nov. 8, 2021

(65) Prior Publication Data

US 2022/0060085 A1    Feb. 24, 2022

Related U.S. Application Data

(63) Continuation of application No. 16/788,560, filed on Feb. 12, 2020, now Pat. No. 11,171,542, which is a continuation of application No. 15/672,712, filed on Aug. 9, 2017, now Pat. No. 10,658,903, which is a continuation of application No. 14/715,079, filed on
(Continued)

(51) Int. Cl.
| | |
|---|---|
| *H02K 7/14* | (2006.01) |
| *H02P 6/14* | (2016.01) |
| *H02P 6/28* | (2016.01) |
| *H02P 6/15* | (2016.01) |
| *B25F 5/00* | (2006.01) |
| *B24B 23/02* | (2006.01) |
| *B24B 47/12* | (2006.01) |
| *H02P 6/04* | (2016.01) |

(52) U.S. Cl.
CPC ........... *H02K 7/145* (2013.01); *B24B 23/028* (2013.01); *B24B 47/12* (2013.01); *B25F 5/008* (2013.01); *H02P 6/14* (2013.01); *H02P 6/15* (2016.02); *H02P 6/28* (2016.02); *H02P 2006/045* (2013.01)

(58) Field of Classification Search
CPC ....... B24B 23/028; B24B 47/12; B25F 5/008; H02P 6/14; H02P 6/15; H02P 6/28; H02P 2006/045; H02K 2213/03
See application file for complete search history.

(56) References Cited

U.S. PATENT DOCUMENTS

| | | |
|---|---|---|
| 5,136,220 A | 8/1992 | Philipp |
| 5,856,715 A | 1/1999 | Peot et al. |
| | (Continued) | |

FOREIGN PATENT DOCUMENTS

| | | |
|---|---|---|
| CN | 2323995 Y | 6/1999 |
| CN | 2822017 Y | 9/2006 |
| | (Continued) | |

*Primary Examiner* — Said Bouziane

(57) ABSTRACT

A power tool comprising a housing and a brushless direct-current (BLDC) motor disposed within the housing. The motor includes a stator and a rotor rotatable relative to the stator. The power tool is configured to generate a power output from the motor such that a quotient obtained by the power output measured in Watts (Wout), divided by an input measured in Volt-Amperes (Vain), and further divided by a diameter of the motor measured in meters (m), is greater than 10 Wout/Vain/m.

10 Claims, 10 Drawing Sheets

Related U.S. Application Data

May 18, 2015, now Pat. No. 9,762,153, which is a continuation-in-part of application No. 14/057,003, filed on Oct. 18, 2013, now Pat. No. 9,314,900.

(56) References Cited

U.S. PATENT DOCUMENTS

| | | |
|---|---|---|
| 5,945,766 A | 8/1999 | Kim et al. |
| 6,320,286 B1 | 11/2001 | Ramarathnam |
| 6,819,022 B2 | 11/2004 | Yamamoto et al. |
| 7,081,698 B1 | 7/2006 | Burkholder et al. |
| 7,271,559 B2 | 9/2007 | Peter, deceased |
| 7,273,159 B2 | 9/2007 | Brotto |
| 7,893,583 B2 | 2/2011 | Du et al. |
| 7,928,692 B2 | 4/2011 | Carrier et al. |
| 8,058,700 B1 | 11/2011 | Sullivan |
| 8,169,168 B2 | 5/2012 | Nagase |
| 8,299,661 B2 | 10/2012 | Jeung |
| 8,409,954 B2 | 4/2013 | Chau et al. |
| 8,779,708 B2 | 7/2014 | Miyazaki |
| 8,933,653 B2 | 1/2015 | Ichikawa et al. |
| 9,154,009 B2 | 10/2015 | Alemu |
| 9,515,597 B2 | 12/2016 | O |
| 2003/0196824 A1 | 10/2003 | Gass et al. |
| 2005/0245182 A1 | 11/2005 | Deshpande et al. |
| 2005/0280385 A1 | 12/2005 | Haller |
| 2006/0096771 A1 | 5/2006 | Brotto |
| 2006/0255756 A1 | 11/2006 | Iwata et al. |
| 2007/0193761 A1 | 8/2007 | Brotto |
| 2007/0210733 A1 | 9/2007 | Du et al. |
| 2007/0240892 A1 | 10/2007 | Brotto et al. |
| 2008/0265695 A1 | 10/2008 | Yoshida et al. |
| 2009/0275273 A1 | 11/2009 | Purohit et al. |
| 2010/0218386 A1 | 9/2010 | Rosskamp et al. |
| 2010/0218966 A1 | 9/2010 | Liebhard et al. |
| 2010/0253162 A1 | 10/2010 | Sakamaki et al. |
| 2010/0283332 A1 | 11/2010 | Toukairin et al. |
| 2011/0171887 A1 | 7/2011 | Tanimoto et al. |
| 2012/0048587 A1 | 3/2012 | Umemura et al. |
| 2012/0074886 A1 | 3/2012 | Miyazaki |
| 2012/0152583 A1 | 6/2012 | Yanagihara et al. |
| 2012/0161498 A1 | 6/2012 | Hansen |
| 2012/0292063 A1 | 11/2012 | Forster et al. |
| 2014/0090862 A1 | 4/2014 | Beutel et al. |
| 2014/0139055 A1 | 5/2014 | Oomori et al. |
| 2014/0147718 A1* | 5/2014 | Furui .............. B25F 5/00 429/99 |
| 2015/0054464 A1 | 2/2015 | Suzuki et al. |

FOREIGN PATENT DOCUMENTS

| | | |
|---|---|---|
| CN | 101378216 B | 10/2012 |
| CN | 103546005 A | 1/2014 |
| EP | 0230639 B1 | 1/1992 |
| EP | 1676427 B1 | 8/2012 |
| JP | H11332203 A | 11/1999 |
| JP | 2003199310 A | 7/2003 |
| JP | 3752933 B2 | 3/2006 |
| JP | 2006067647 A | 3/2006 |
| JP | 2011148069 A | 8/2011 |
| JP | 5292530 B2 | 9/2013 |
| JP | 5454777 B2 | 3/2014 |
| KR | 100680377 B1 | 2/2007 |
| KR | 20140078598 A | 6/2014 |
| WO | 2000057681 A1 | 9/2000 |
| WO | 2006011938 A2 | 2/2006 |
| WO | 2012132564 A1 | 10/2012 |

* cited by examiner

HANDHELD POWER TOOL WITH A BRUSHLESS ELECTRIC MOTOR

CROSS-REFERENCE TO RELATED APPLICATIONS

This application is a continuation application of U.S. application Ser. No. 16/788,560 filed Feb. 12, 2020, which is a continuation application of U.S. application Ser. No. 15/672,712 filed Aug. 9, 2017, now U.S. Pat. No. 10,658,903 issued May 19, 2020, which is a continuation of U.S. application Ser. No. 14/715,079 filed May 18, 2015, now U.S. Pat. No. 9,762,153, issued Sep. 12, 2017, which is a continuation-in-part of U.S. patent application Ser. No. 14/057,003 filed on Oct. 18, 2013, now U.S. Pat. No. 9,314,900, issued Apr. 19, 2016. The entire disclosure of each of the above applications are incorporated herein by reference.

FIELD

The present disclosure relates generally to handheld power tools and more specifically to a handheld grinder with a brushless electric motor.

BACKGROUND

Some power tools include brushless electric motors. Power tools with brushless electric motors use a rectifier to convert an alternating current (AC) input into a direct current (DC) that is used to drive the brushless electric motor. Power tools with brushless electric motors also employ a capacitor to lessen ripple and to provide a current when the AC input voltage is unable to do so. Most power tools also include a power switch that directly controls the flow of current through the brushless electric motor. The capacitor and the power switch generate undesirable heat.

Most power tools include several circuit boards that reside inside a housing of the power tool. The circuit boards are used to support the capacitor, the power switch and circuitry that is used for controlling the brushless motor. The circuit boards undesirably increase the volume of the power tool. The connections between the circuit boards are susceptible to wearing out or breaking. This makes the power tool less reliable. Therefore, there is a need for a power tool that has a smaller volume, generates less heat and is more reliable.

This section provides background information related to the present disclosure which is not necessarily prior art.

SUMMARY

A handheld grinder is presented. The handheld grinder comprises an elongated housing having a grip portion that is shaped to be grasped by a user; a grinding disk; an electric motor having a drive shaft; an output shaft having a one end connected to the grinding disk and an opposing end drivably connected to the drive shaft of the motor to impart rotary motion thereto; and a circuit board residing in the housing, the circuit board having thereon a rectifier configured to receive power from an alternating current (AC) power source and operable to convert an alternating current to a direct current, a switching arrangement having a plurality of motor switches connected electrically between the rectifier and the electric motor and operates to deliver the direct current from the rectifier to the electric motor, a capacitor connected electrically between the rectifier and the switching arrangement, wherein the capacitor is coupled in parallel across the rectifier, a driver circuit interfaced with the motor switches and operable to control switching operation of the motor switches, and a power switch connected electrically between the rectifier and the driver circuit and operable by a tool operator to selectively energize the driver circuit and thereby power on the grinder disk.

This section provides a general summary of the disclosure, and is not a comprehensive disclosure of its full scope or all of its features.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
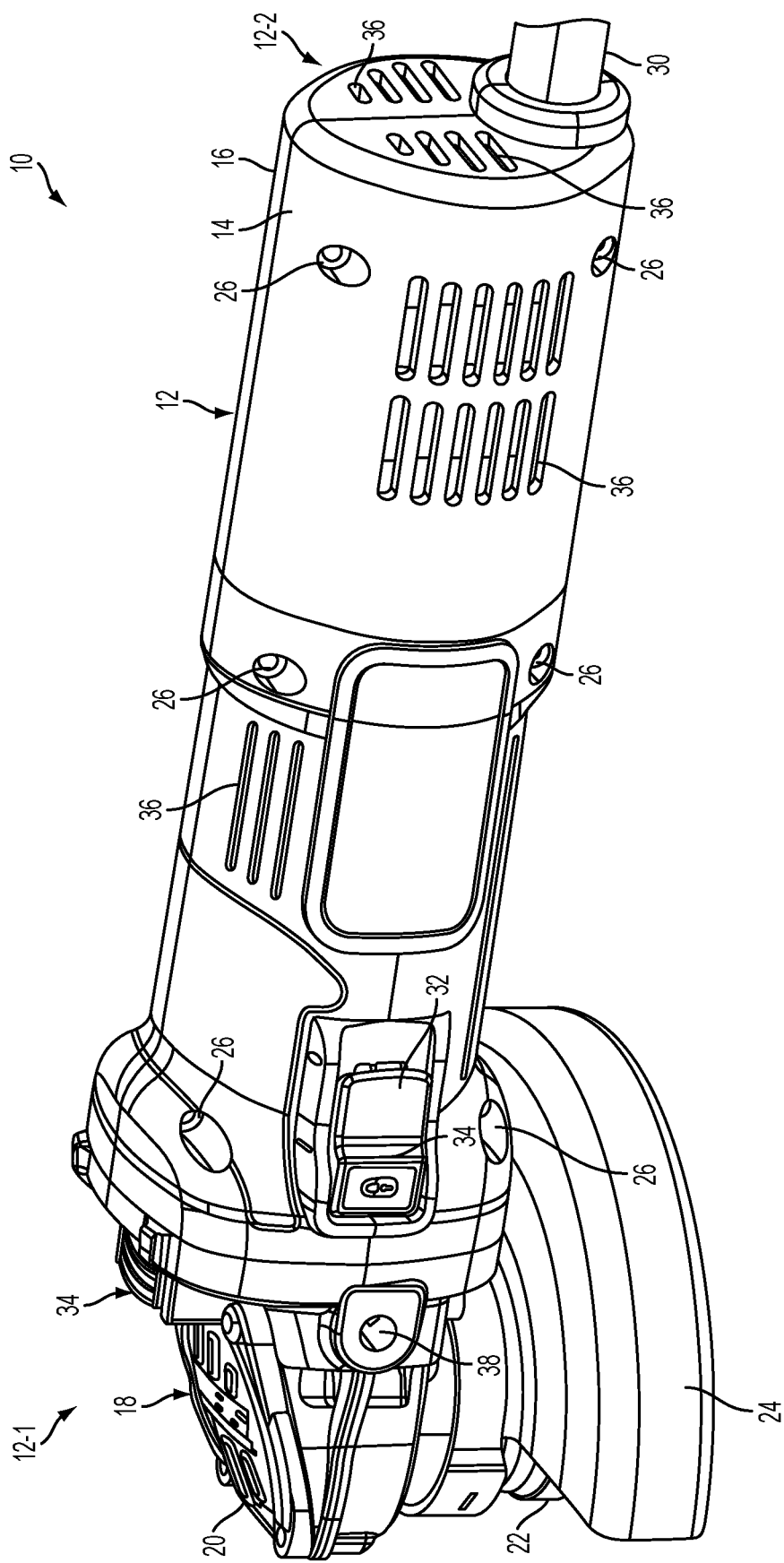
FIG. 1 is an illustration depicting a perspective view of an example power tool.

FIG. 1 depicts an example power tool 10. In this example embodiment, the power tool 10 comprises a housing 12 having an elongated shape. A user can grasp the power tool 10 by placing the palm of the user's hand over and around the housing 12. An output member 18 is positioned at one end 12-1 of the housing 12 and comprises a right angle gearset 20 that drives a rotating disk 22. In this example embodiment, the rotating disk 22 comprises a grinder disk.

The rotating disk 22 may be removed and replaced with a new rotating disk. For example, a user of the power tool 10 may replace the existing rotating disk 22 with a new rotating disk after the existing rotating disk 22 wears out.

An adjustable guard 24 may cover at least a portion of the rotating disk 22 to obstruct sparks and debris generated during operation of the power tool 10.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw driver bit, thereby allowing the power tool 10 to be used as a power drill or a power screw driver. In another example embodiment, the output member 18 may be removed and replaced with another output member that may be more suitable for a drill, a screw driver, or any other power tool.

The housing 12 has a first portion 14 and a second portion 16. The first portion 14 and second portion 16 may be secured together with screws 26, illustratively six, and enclose an electric motor 28 and electronic circuit components, as further described below, that drive the output member 18. While the present description is provided with reference to a brushless electric motor, the electric motor 28 may be any type of electrical motor capable of driving the output member 18. A power cord 30 is connectable to an AC power source and is positioned at an opposite end 12-2 of the housing 12. The power cord 30 provides power to the electric motor 28 and the electronic circuit components of the power tool 10.

The first portion 14 further includes a power on/off switch 32 and a spindle lock switch 34. Putting the power on/off switch 32 in on and off positions turns on and turns off the electric motor 28, respectively. Pressing and holding the spindle lock switch 34 enables the user to change the rotating disk 22. A plurality of narrow slot openings 36 of the first 14 and second 16 portions allow for venting of the electric motor 28 and the electronic circuit components. The one end 12-1 of the housing 12 also includes a threaded opening 38 for selectively attaching a side-handle (not shown) to enable two-handed operation.

Figure 2:
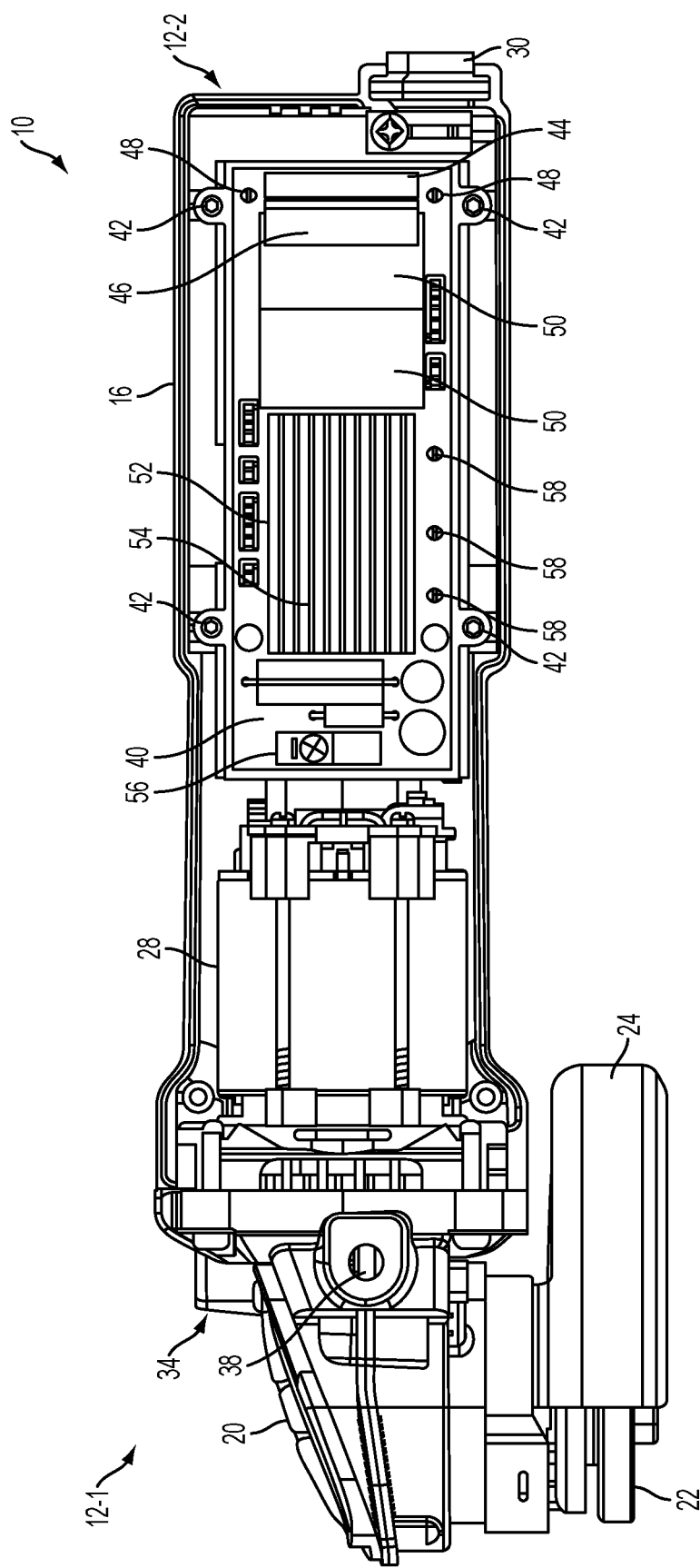
FIG. 2 is an illustration depicting a cross-sectional view of the example power tool having an example circuit board residing therein.

FIG. 2 depicts a cross sectional view of the power tool 10 with the first portion 14 of the housing 12 removed. The power tool 10 includes a circuit board 40 that resides inside the housing 12. In this embodiment, the circuit board 40 is fastened to the second portion 16 of the housing 12 with screws 42. Other fasteners are also contemplated, for example bolts, clips, ties, latches, pegs, snap fasteners, or the like.

In this example embodiment, the circuit board 40 has a longitudinal axis that is aligned with the longitudinal axis of the housing 12. In this embodiment, the circuit board 40 is rectangular. However, other shapes of the circuit board 40 are also contemplated. For example, the circuit board 40 may be a square. Alternatively, the circuit board 40 may be circular and the circuit board 40 may be positioned such that a planar surface of the circuit board 40 is perpendicular to the longitudinal axis of the housing 12.

A plurality of electronic circuit components of the power tool 10 are attached to the circuit board 40 and are configured to control the electric motor 28. The electronic circuit components may be attached to the circuit board 40 by soldering the electronic circuit components on the circuit board 40.

The circuit board 40 includes a rectifier 44. The rectifier 44 receives an alternating current and converts the alternating current into a direct current. The rectifier 44 may be a commercially-available full-wave bridge rectifier.

In this embodiment, the circuit board 40 includes AC input solder points 48. The AC input solder points 48 are soldered at an end of the circuit board 40 that is proximate to the end 12-2 of the housing 12. Wires can be connected from the power cord 30 to the AC input solder points 48 to deliver the alternating current to the rectifier 44.

The circuit board 40 may include a heat sink 46 for diffusing heat away from the rectifier 44. In this example embodiment, the heat sink 46 is placed adjacent to the rectifier 44 and is abutting the rectifier 44.

DC bus capacitors 50 are soldered adjacent to the rectifier 44. In this embodiment, there are two DC bus capacitors 50, each having a capacitance of about 10 μF. In an alternate embodiment, the DC bus capacitors 50 may include just one 20 μF capacitor instead of two 10 μF capacitors. Other configurations of the DC bus capacitors 50 are also contemplated, for example the number of DC bus capacitors 50 may be three, four, six, eight, etc. In this embodiment, each DC bus capacitor 50 has a longitudinal axis that is perpendicular to the longitudinal axis of the housing 12. In another embodiment, the longitudinal axes of the DC bus capacitors 50 may be aligned with the longitudinal axis of the housing 12.

In this embodiment, the DC bus capacitors 50 are robust capacitors and not traditional electrolytic smoothening capacitors. Advantageously, the DC bus capacitors 50 have smaller physical dimensions than traditional electrolytic smoothening capacitors that typically have a capacitance of over 100 μF. The DC bus capacitors 50 generate less heat than typical smoothening capacitors that are 100 μF or greater. In this example embodiment, the DC bus capacitors 50 are film capacitors. The film capacitors can be made from polymer plastics metalized on both sides and may be rolled with additional suitable insulators. Advantageously, the smaller physical dimensions and the smaller footprint of the DC bus capacitors 50, in comparison to traditional smoothening capacitors that are greater than 100 μF, allows placement of the DC bus capacitors 50 onto the circuit board 40 instead of a separate circuit board or placement within housing 12 as disjoint components connected to other components or circuit boards by means of wiring connections.

In this example embodiment, the circuit board 40 includes an integrated power module (IPM) 52. The IPM 52 is soldered adjacent to the DC bus capacitors 50. The IPM 52 includes a switching arrangement that has a plurality of motor switches, a driver circuit and a driver power supply. The motor switches may be connected electrically between the rectifier 44 and the electric motor 28. The motor switches selectively deliver direct current from the rectifier 44 to electromagnets of the electric motor 28. The driver circuit controls the state of the motor switches, for example between an 'on' state and an 'off' state. The driver power supply supplies power to the driver circuit.

The circuit board 40 may include a heat sink 54 that may be positioned on top of the IPM 52. In this embodiment, the heat sink 54 is abutting a top surface of the IPM 52. Additional or alternative cooling mechanisms are also contemplated for cooling the IPM 52. For example, a fan may be mounted on the circuit board 40 to cool the IPM 52.

The circuit board 40 includes a power switch for selectively turning the power tool 10 on and off. In this example embodiment, the power switch is shown as a switch contact 56 of the power on/off switch 32. The switch contact 56 is soldered on the circuit board 40. In this embodiment, the switch contact 56 is positioned at an end of the circuit board 40 that is proximate to the electric motor 28. Other positions are also contemplated. For example, the switch contact 56 may be interposed between the IPM 52 and the DC bus capacitors 50.

The switch contact 56 may be a mechanical switch that is mechanically coupled with the power on/off switch 32.

Example mechanical switches include a toggle switch, a rocker switch, a push-button switch, or the like. Alternatively, the switch contact 56 may be an electronic switch that is connected to the power on/off switch 32 with a wire. Examples of electronic switches include a relay, a transistor, or the like.

The switch contact 56 changes states when a user of the power tool 10 changes a position of the power on/off switch 32. For example, if the power on/off switch 32 is moved to an 'on' position then the switch contact 56 moves to a corresponding 'on' state to power on the power tool 10. Similarly, if the power on/off switch 32 is moved to an 'off' position then the switch contact 56 moves to a corresponding 'off' state to power down the power tool 10.

The switch contact 56 operates at a voltage that is lower than the voltage at which the electric motor 28 operates. The switch contact 56 also operates at a current that is lower than the current at which the electric motor 28 operates. As an example, the electric motor 28 typically draws a current that is higher than one ampere (1 A) and can reach up to 15 A, whereas the current passing through the switch contact 56 is less than 1 A (e.g. 200 mA).

Advantageously, the switch contact 56 is physically smaller than a switch that operates at the same voltage and current levels as the electric motor 28. The switch contact 56 also generates less heat than a switch that operates at the same voltage and current levels as the electric motor 28. The smaller physical dimensions and smaller footprint allow placement of the switch contact 56 on the circuit board 40.

If the switch contact 56 operated at the same voltage and current levels as the electric motor 28, then the switch contact 56 might have greater physical dimensions and might generate more heat. Greater physical dimensions and larger heat generation may have required the switch contact 56 to be placed on a separate circuit board or placement within housing 12 as a disjoint component connected to other components or circuit boards by means of wiring connections. Using a separate circuit board for the switch contact 56 would increase the number of inter-board connections and may reduce the reliability of the power tool 10 by making the power tool 10 susceptible to more connection breakages. Using an additional circuit board for the switch contact 56 may undesirably increase the size of the power tool 10.

Being able to place the switch contact 56 on the same circuit board 40 as the other electronic components reduces the need for a separate circuit board for the switch contact 56. This reduces the number of inter-board connections and increases the reliability of the power tool 10 by making the power tool 10 less susceptible to connection breakages.

The circuit board 40 may include motor connections 58. The motor connections 58 may be solder points that are similar to the AC input solder points 48. Wires may be connected from the motor connections 58 to the electric motor 28 to supply current to the electric motor 28.

Advantageously, by soldering the rectifier 44, the DC bus capacitors 50, the motor switches, the driver circuit and the switch contact 56 onto the single circuit board 40, as opposed to multiple circuit boards, the number of inter-circuit board connections are minimized. Inter-circuit board connections tend to loosen or break due to vibratory motion of the power tool when the power tool is operated. By minimizing the number of connections between circuit boards and disjoint components, the reliability of the power tool 10 may have increased.

Another advantage of soldering the rectifier 44, the DC bus capacitors 50, the motor switches, the driver circuit and the switch contact 56 onto the single circuit board 40, as opposed to multiple circuit boards, is that the power tool 10 is more compact. For example, the housing 12 of the power tool 10 has a diameter of about 54 mm and the housing 12 has a girth (i.e. circumference) of about 170 mm.

Figure 3:
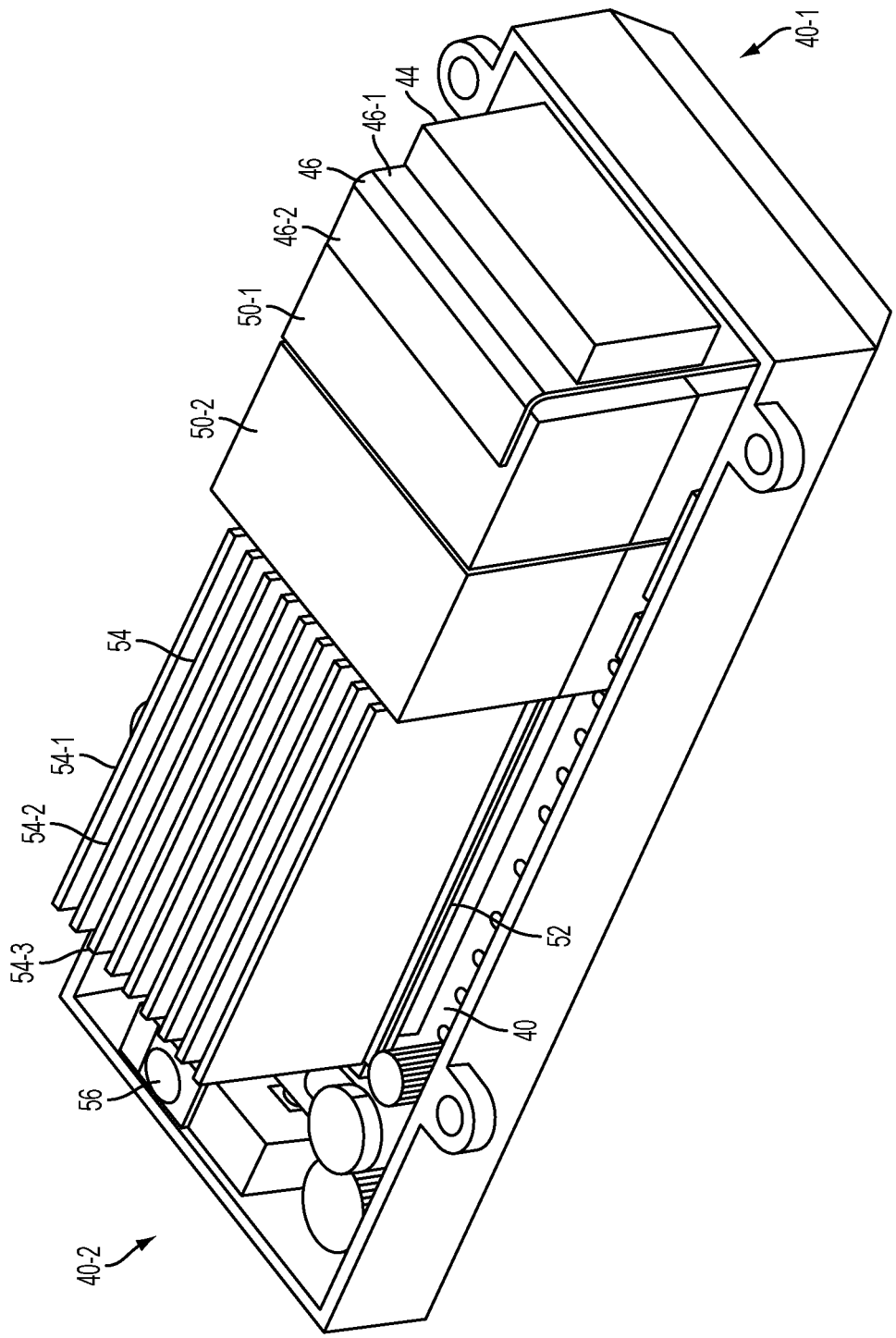
FIG. 3 is an illustration depicting a perspective view of the example circuit board illustrated in FIG. 2.

FIG. 3 is a perspective view of the circuit board 40. The circuit board 40 has a first end 40-1 and an opposing second end 40-2.

In this example embodiment, the rectifier 44 is soldered on the circuit 40 at the first end 40-1 and the switch contact 56 is soldered at the second end 40-2 of the circuit board 40.

In this example embodiment, the heat sink 46 is interposed between the rectifier 44 and one of the DC bus capacitors 50-1. As illustrated, the heat sink 46 has a first portion 46-1 and a second portion 46-2. The first portion 46-1 is perpendicular to a soldering surface of the circuit board 40 on which the rectifier 44 and other components are soldered. The first portion 46-1 extends downwardly towards the soldering surface of the circuit board 40 along a wall of the rectifier 44. The first portion 46-1 is abutting the wall of the rectifier 44. The second portion 46-2 is folded over the top of the DC bus capacitor 50-1 to increase its mass and surface area within the confines of the housing 12, but does not abut the DC bus capacitor 50-1. Advantageously, by abutting the walls of the rectifier 44, the heat sink 46 is able to dissipate some of the heat generated by the rectifier 44.

The second portion 46-2 of the heat sink 46 is perpendicular to the first portion 46-1 of the heat sink 46. The second portion 46-2 extends parallel to the soldering surface of the circuit board 40. The second portion 46-2 extends along but does not abut a top surface of the DC bus capacitor 50-1. In this embodiment, the second portion 46-2 partially covers the top surface of the DC bus capacitor 50-1. In other embodiments, the second portion 46-2 may cover the entire top surface of the DC bus capacitor 50-1 and may further cover a top surface of the DC bus capacitor 50-2. Other configurations of the heat sink 46 are also contemplated.

In this example embodiment, the IPM 52 is interposed between the DC bus capacitors 50 and the switch contact 56. The IPM 52 contains the switching arrangement and the driver circuit. The switching arrangement includes motor switches. The motor switches may be transistors, such as insulated gate bipolar transistors (IGBTs). The motor switches may be switched on and off at a very high rate when the power tool 10 is being operated. Switches, especially transistors such as IGBTs, generate heat when they are rapidly switched on and off. Similarly, the driver circuit that is driving the motor switches may also generate heat when the power tool 10 is being operated. The driver power supply that is regulating the power to the driver circuit may also generate heat. In sum, the IPM 52 may generate heat while the power tool 10 is being operated.

In this example embodiment, the heat sink 54 dissipates the heat generated by the IPM 52. The heat sink 54 has a plurality of fins, for example 54-1, 54-2, 54-3, etc. The fins 54-1, 54-2, 54-3 increase the surface area of the heat sink 54 thereby facilitating faster heat dissipation. In another embodiment, a coolant may be passed through the fins 54-1, 54-2, 54-3 of the heat sink 54 to accelerate the heat dissipation. Other cooling mechanisms are also contemplated for cooling the IPM 52, for example a fan may be used to dissipate heat generated by the IPM 52.

In this embodiment, the switch contact 56 is positioned at the second end 40-2 of the circuit board 40. However, in other embodiments, the switch contact 56 may be positioned at other portions of the circuit board 40. For example, in an alternate embodiment, the IPM 52 may be soldered at the second end 40-2 of the circuit board 40 and the switch contact 56 may be interposed between the IPM 52 and the DC bus capacitor 50-2.

Figure 4:
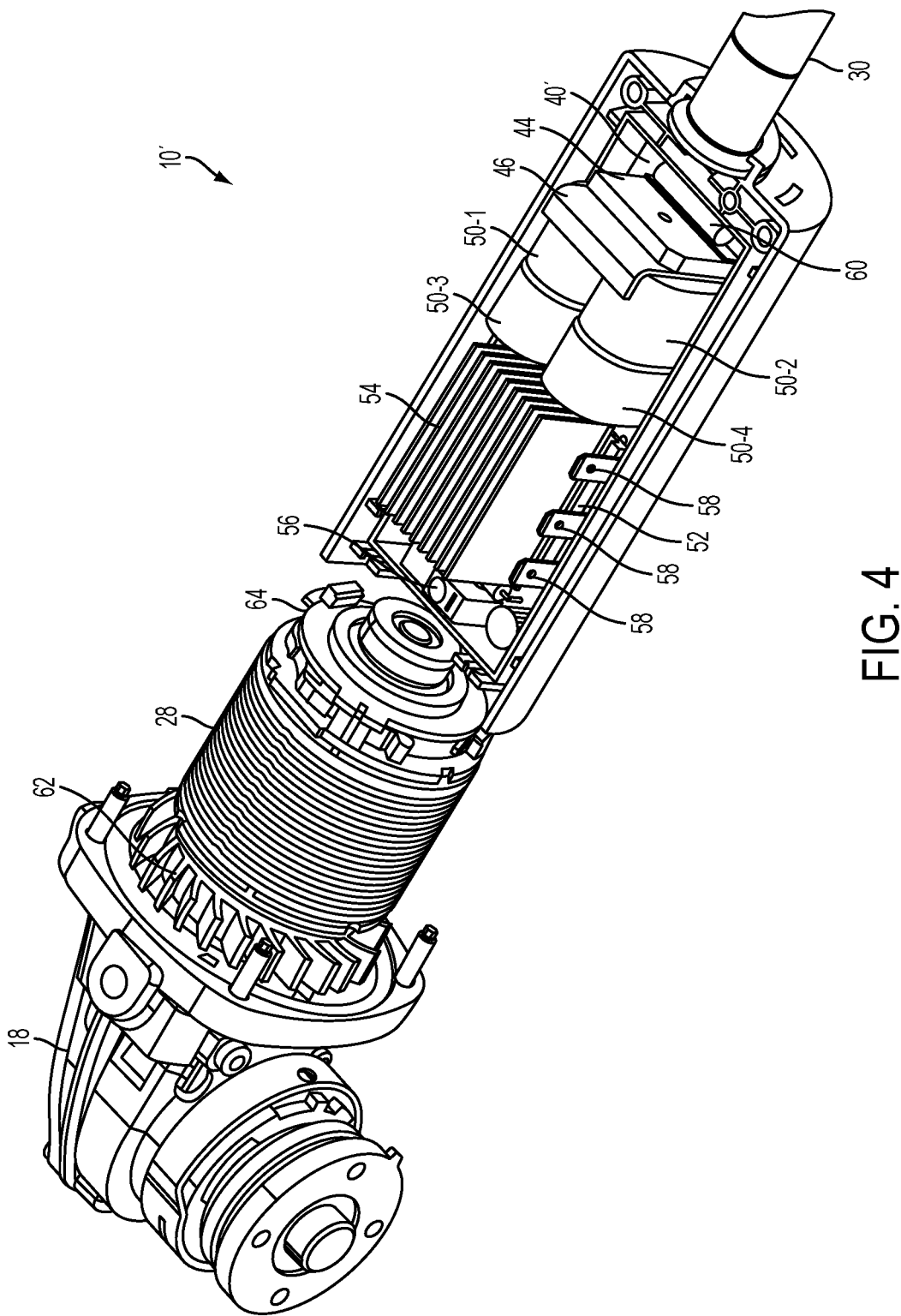
FIG. 4 is an illustration depicting a perspective view of the example power tool having another example circuit board residing therein.

FIG. 4 depicts a power tool 10' with another example circuit board 40'. The power tool 10' receives AC power through the power cord 30. The AC power passes through a fuse 60 before reaching an input of the rectifier 44. AC power often experiences sudden unexpected current and/or voltage surges. Such sudden surges can damage the electronic components on the circuit board 40' because most electronic components are designed to operate at steady current and voltage values.

The fuse 60 may turn off the power tool 10' when the current being supplied by the power cord 30 exceeds a current rating of the fuse 60. The fuse 60 may be reset either manually by a user of the power tool 10' or automatically by an electronic controller of the power tool 10'. The fuse 60 may also be removed and replaced with a new fuse 60. Advantageously, the fuse 60 protects the rectifier 44 and other electronic components on the circuit board 40' from current surges in the AC power being supplied by the power cord 30.

In this example embodiment, the circuit board 40' includes four DC bus capacitors 50-1, 50-2, 50-3, 50-4 that are arranged on the circuit board in a two-by-two (2×2) array. Each capacitor has a capacitance of about 4.7 µF which brings the total capacitance of the DC bus capacitors 50 to about 18.8 µF. In an alternate embodiment, each DC bus capacitor 50-1, 50-2, 50-3, 50-4 may have a capacitance ranging from about 4 µF to 5 µF, summing the total capacitance to about 16 µF to 20 µF. Other configurations, arrangements and capacitance values are also contemplated, for example the total capacitance may be as low as 10 µF.

In this example embodiment, the power tool 10' includes a fan 62 that is connected to a drive shaft of the electric motor 28 and is driven by the electric motor 28. The fan 62 is positioned between the electric motor 28 and the output member 18. The fan 62 is driven by the electric motor 28 when the power tool 10' is being operated. The fan 62 circulates air through the power tool 10'.

In this example embodiment, the fan 62 draws air into the housing 12 of the power tool 10'. The air that the fan 62 draws into the housing 12 makes contact with the heat sinks 46, 54 and facilitates further cooling of the rectifier 44, the DC bus capacitors 50 and the IPM 52.

In an alternate embodiment, the fan 62 forces air out of the housing 12 of the power tool 10'. The fan 62 removes hot air surrounding the heat sinks 46, 54 to facilitate further cooling of the rectifier 44, the DC bus capacitors 50 and the IPM 52.

The power tool 10' includes a second printed circuit board (PCB) 64. A position sensor, such as a Hall effect sensor, is mounted on the second PCB 64. The Hall effect sensor may be connected to the controller. The Hall effect sensor includes a transducer that varies its output voltage in response to a magnetic field generated by electromagnets of the electric motor 28. As the electric motor 28 rotates, the magnetic field sensed by the Hall effect sensor changes. The Hall effect sensor is used to determine a position and/or a speed of the electric motor 28. Other position and/or speed sensors for detecting the position and/or the speed of the electric motor 28 are also contemplated, for example an infrared (IR) sensor. Alternatively, the power tool 10' may operate without the aid of any Hall effect sensor and without printed circuit board 64.

Figure 5:
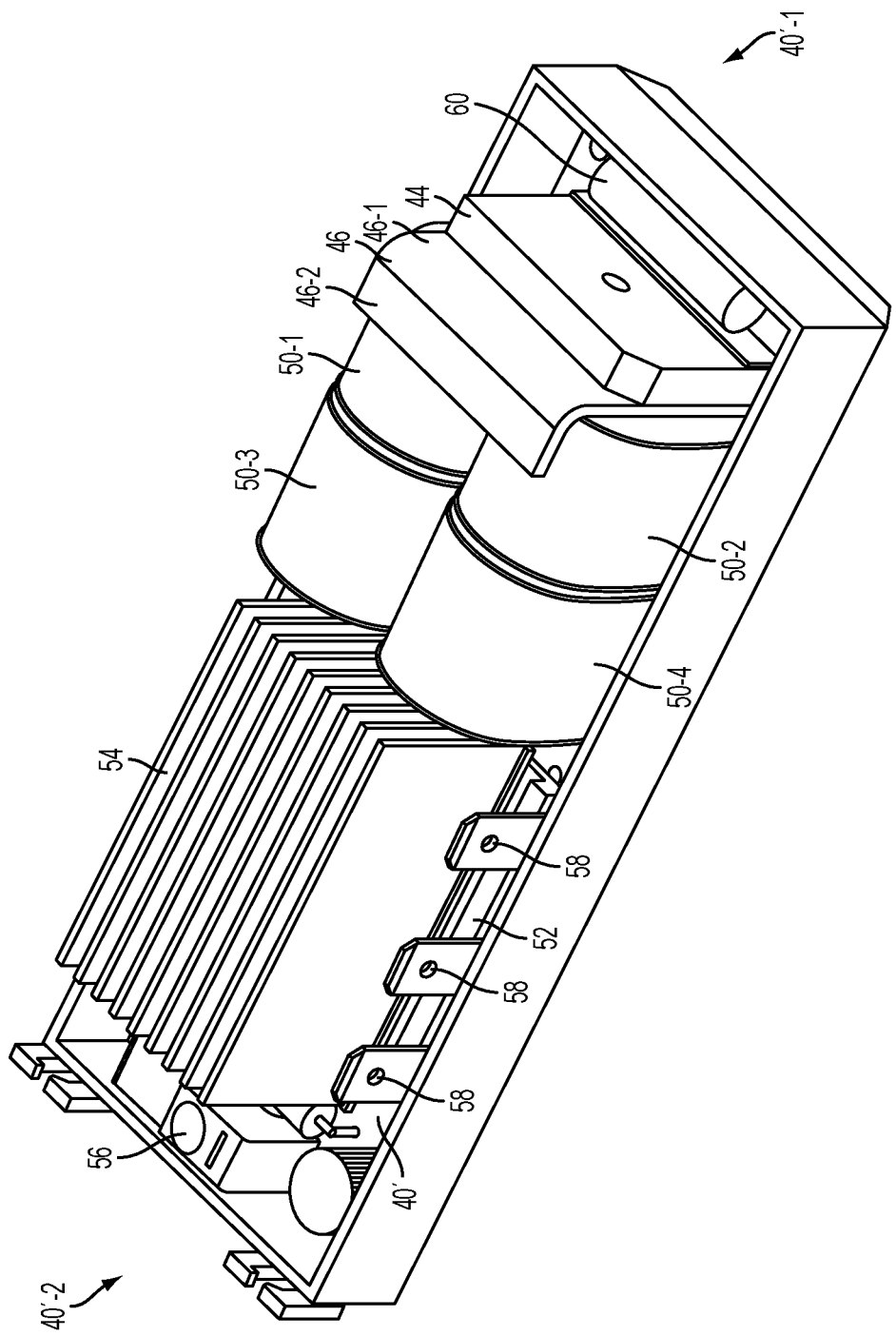
FIG. 5 is an illustration depicting a perspective view of the circuit board illustrated in FIG. 4.
Figure 6:
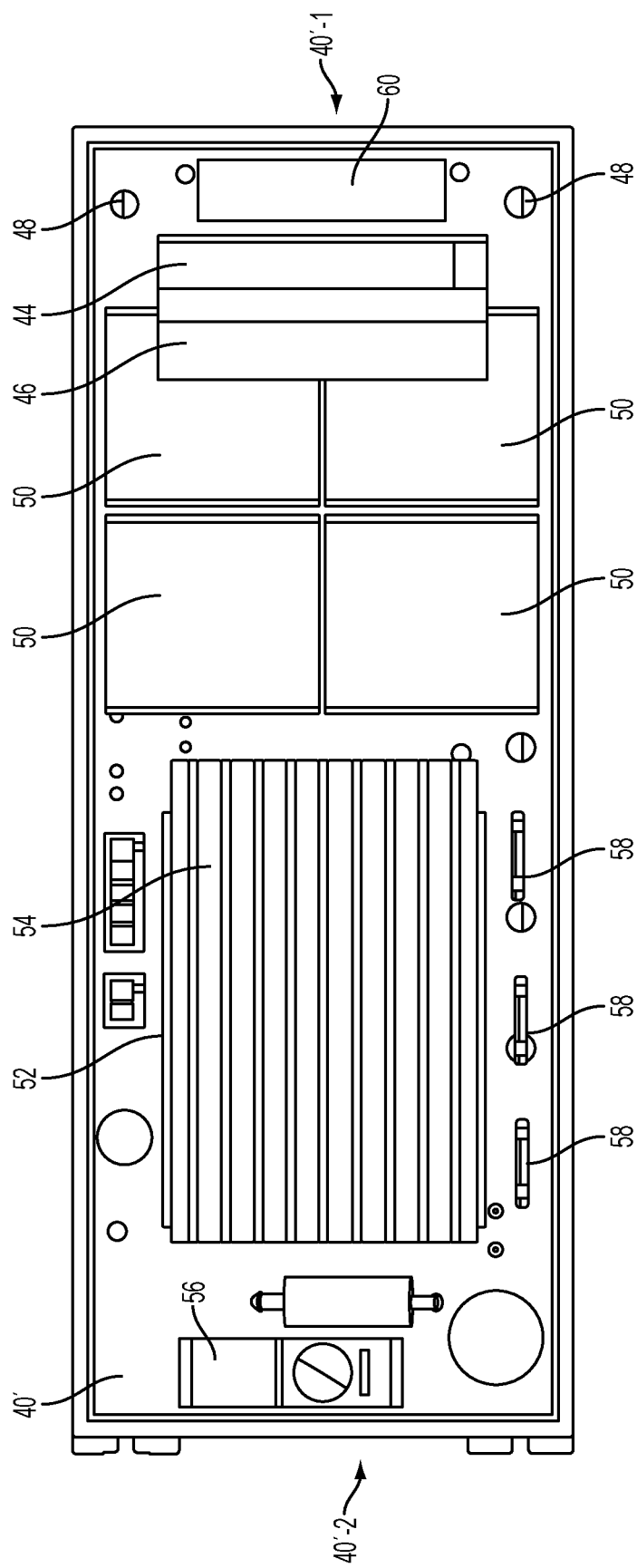
FIG. 6 is an illustration depicting a plan view of the circuit board illustrated in FIG. 4 and FIG. 5.

Referring to FIG. 5 and FIG. 6, the circuit board 40' has a first end 40'-1 and an opposing second end 40'-2.

In this example embodiment, the fuse 60 is soldered at the first end 40'-1 of the circuit board 40' and the switch contact 56 is soldered at the second end 40'-2 of the circuit board 40'. The rectifier 44 is soldered adjacent to the fuse 60.

In this example embodiment, the heat sink 46 is interposed between the rectifier 44 and two DC bus capacitors 50-1, 50-2. The first portion 46-1 of the heat sink 46 is abutting the wall of the rectifier 44. Advantageously, by abutting the walls of the rectifier 44, the heat sink 46 is able to dissipate some of the heat generated by the rectifier 44.

The second portion 46-2 of the heat sink 46 extends along and does not abut the top surfaces of the DC bus capacitors 50-1, 50-2. In this embodiment, the second portion 46-2 partially covers the top surfaces of the DC bus capacitors 50-1, 50-2. In other embodiments, the second portion 46-2 may cover the entire top surfaces of the DC bus capacitors 50-1, 50-2 and may further cover top surfaces of the DC bus capacitors 50-3, 50-4. Other configurations of the heat sink 46 are also contemplated.

In this example embodiment, the IPM 52 is interposed between the DC bus capacitors 50-3, 50-4 and the switch contact 56. The heat sink 54 is positioned on a top surface of the IPM 52 to dissipate the heat generated by the IPM 52. Other cooling mechanisms for cooling the IPM 52 are also contemplated.

In this example embodiment, the switch contact 56 is positioned at the second end 40'-2 of the circuit board 40'. However, in other embodiments, the switch contact 56 may be positioned at other portions of the circuit board 40'. For example, in an alternate embodiment, the IPM 52 may be soldered at the second end 40'-2 of the circuit board 40' and the switch contact 56 may be interposed between the IPM 52 and the DC bus capacitors 50-3, 50-4.

Figure 7:
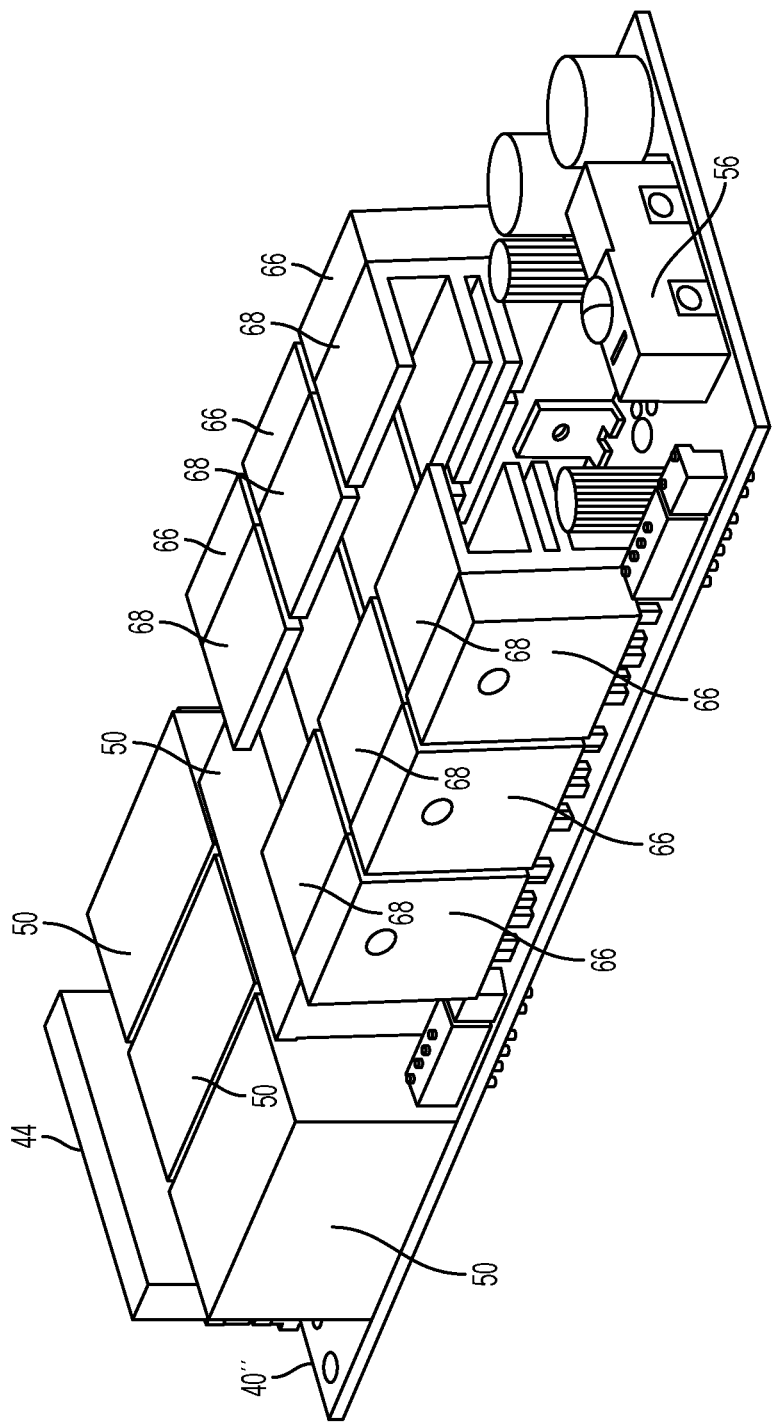
FIG. 7 is an illustration depicting a perspective view of yet another example circuit board.
Figure 8:
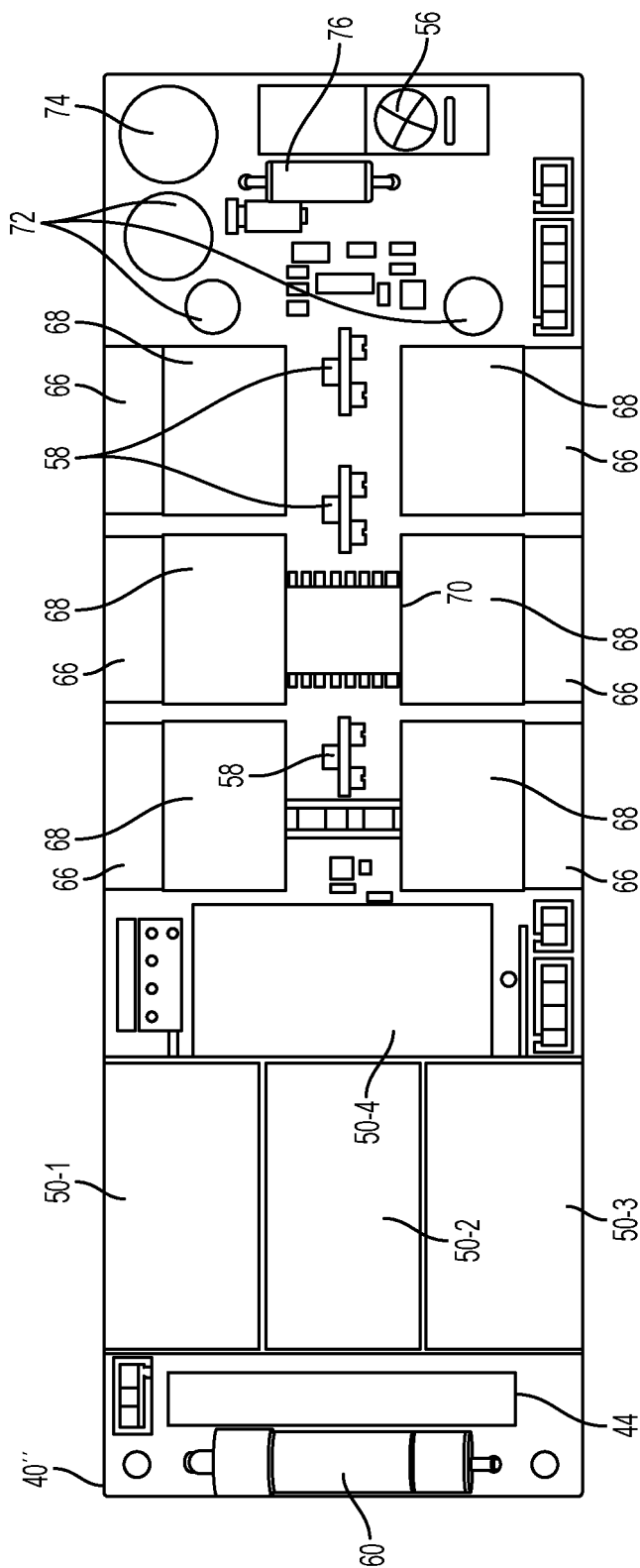
FIG. 8 is an illustration depicting a plan view of the circuit board illustrated in FIG. 7.

Referring to FIG. 7 and FIG. 8, a circuit board 40" is presented. The circuit board 40" includes six IGBTs 66 that operate as motor switches as part of the switching arrangement. The circuit board 40" includes six heat sinks 68 that are positioned adjacent to the IGBTs 66 to dissipate the heat generated by the IGBTs. Each heat sink 68 is abutting a wall of a corresponding IGBT 66. Each heat sink 68 includes fins that extend towards the center of the circuit board 40".

In this example embodiment, three IGBTs 66 are placed at one edge of the circuit board 40" and another three IGBTs 66 are placed at another opposing edge of the circuit board 40". By placing sets of three IGBTs 66 at opposing edges of the circuit board 40", the heat generated by the IGBTs 66 is distributed over a greater surface area of the circuit board 40".

However, in an alternate embodiment, the heat sinks 68 may be placed at the edges of the circuit board 40" and the IGBTs 66 may be placed more towards the center of the circuit board 40". In another alternate embodiment, only two heat sinks 68 may be provided and each heat sink 68 may abut walls of three IGBTs 66.

In this example embodiment, the circuit board 40" includes a driver circuit 70 that drives the IGBTs 66. The driver circuit 70 may supply pulse width modulated (PWM) signals to each of the IGBTs 66 in order to control the states of the IGBTs 66 by switching the IGBTs 66 between 'on' and 'off' states. In this embodiment, the circuit board 40" further includes capacitors 72, an inductor 74 and a resistor 76.

In this example embodiment, the circuit board 40" includes four DC bus capacitors 50-1, 50-2, 50-3, 50-4, each having a longitudinal axis. Three DC bus capacitors 50-1, 50-2, 50-3 have longitudinal axis' that are aligned with the longitudinal axis of the circuit board 40". The fourth DC bus capacitor 50-4 has a longitudinal axis that is perpendicular to the longitudinal axis of the circuit board 40".

Figure 9:
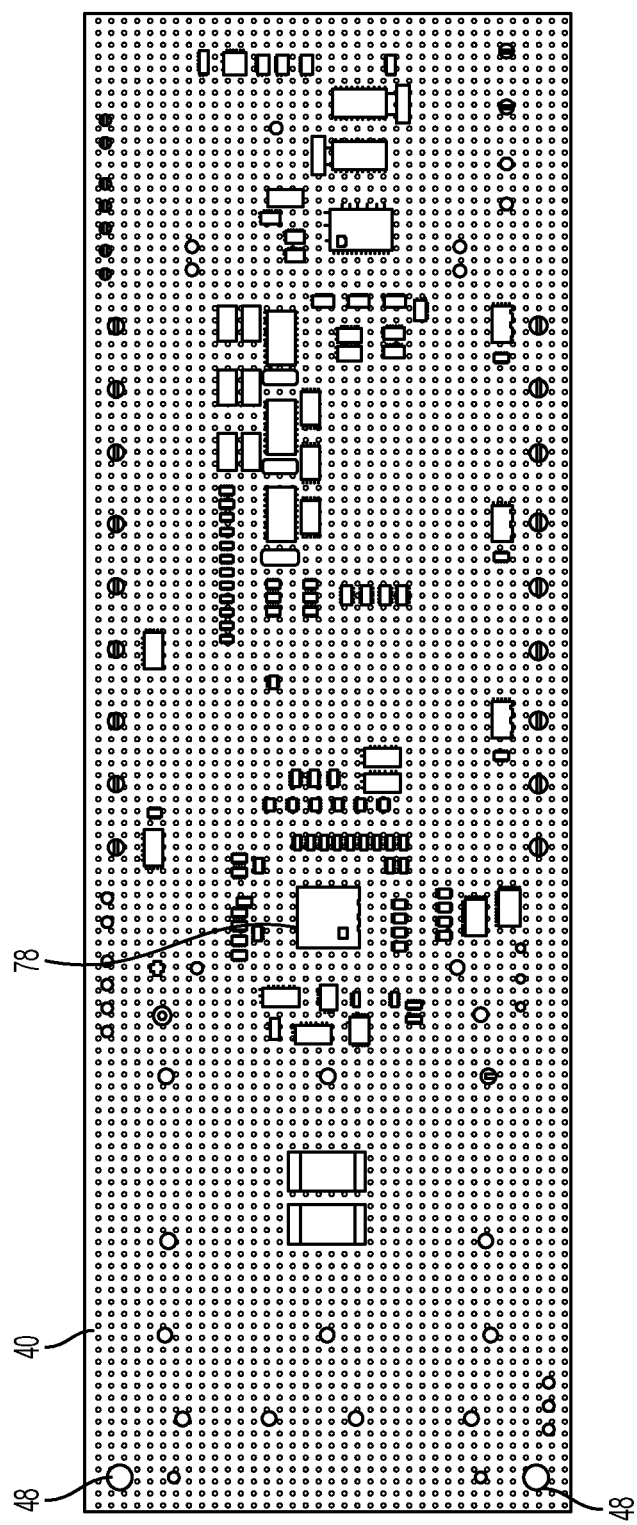
FIG. 9 is an illustration depicting a plan view of a back surface of an example circuit board.

FIG. 9 depicts a back surface of the circuit board 40. Various connections for the electronic components soldered to the circuit board 40 can be seen. In particular, a controller 78 is shown. The controller 78 may be a microcontroller.

Figure 10:
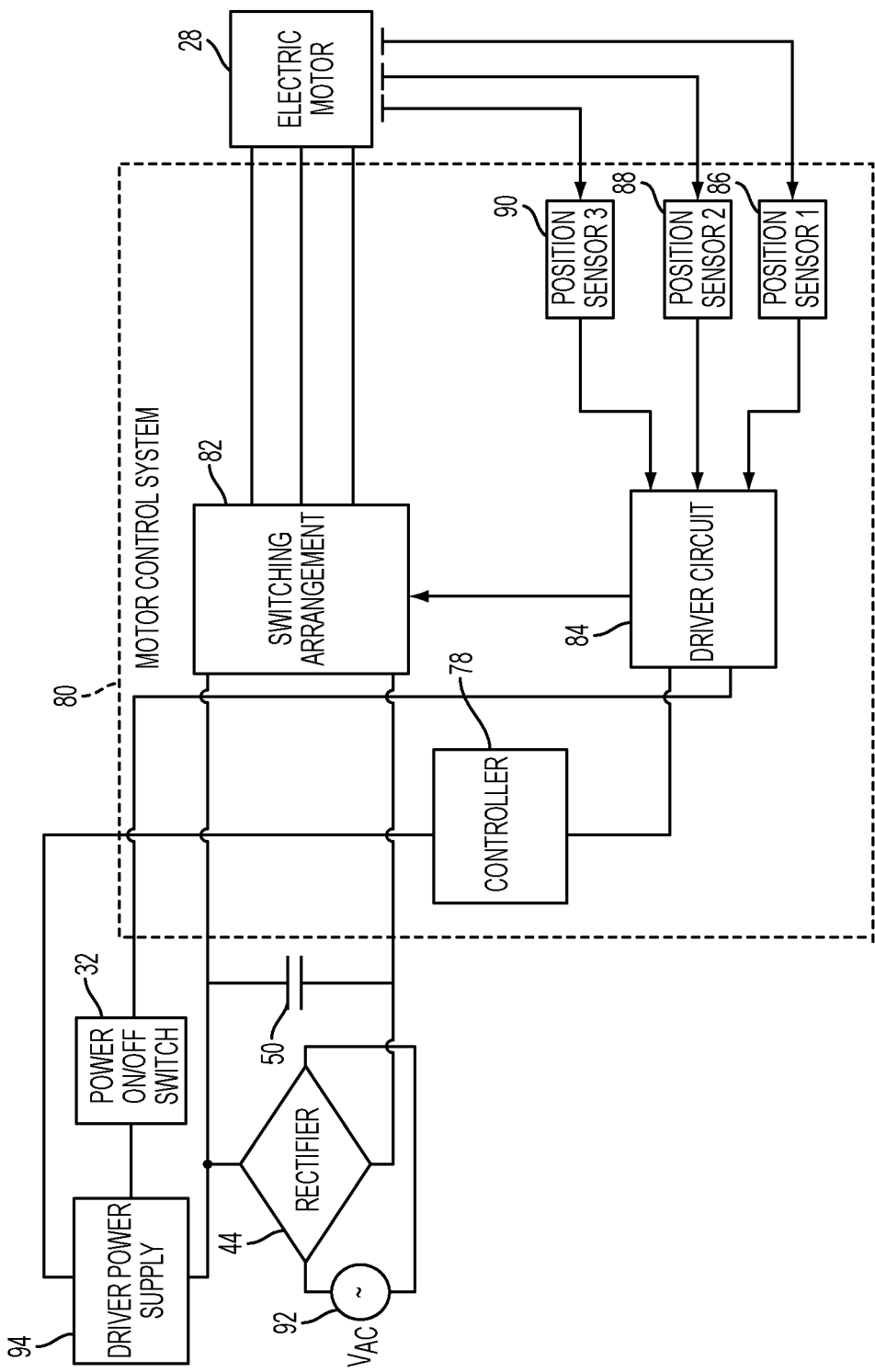
FIG. 10 is a schematic depicting an example embodiment of a motor control system having a power on/off switch that is positioned between a driver power supply and a driver circuit.

FIG. 10 depicts a schematic that illustrates an embodiment of a motor control system 80 that may be employed by the power tool 10. The motor control system 80 is comprised generally of the controller 78, a switching arrangement 82 and a driver circuit 84. The motor control system 80 may further include position sensors 86, 88, 90 (e.g. the Hall effect sensors on the second PCB 64) that are configured to detect rotational motion of the electric motor 28 and generate a signal indicative of the rotational motion. The signal may have a periodic waveform whose magnitude may vary in accordance with the rotational position of the electric motor 28. In other embodiments the position sensors 86, 88, 90 may connect to controller 78.

An AC power supply 92 delivers an alternating current to the rectifier 44, for example through the power cord 30. The rectifier 44 converts the alternating current into a direct current. The output of the rectifier 44 may be a pulsating DC signal and not a pure DC signal.

In this example embodiment, the DC bus capacitors 50 are electrically connected in parallel with the rectifier 44. In an example embodiment, the DC bus capacitors 50 may smoothen the output of the rectifier 44 by converting the pulsating DC signal outputted by the rectifier 44 into a pure DC signal or a substantially pure DC signal or a somewhat smoothened DC signal or a slightly smoothened DC signal.

In this example embodiment, the switching arrangement 82 is electrically connected with the DC bus capacitors 50 and may receive the pure DC signal or the substantially pure DC signal from the DC bus capacitors 50. The switching arrangement 82 includes a plurality of motor switches that, when switched on, deliver the DC current to the electric motor 28. Example motor switches are the IGBTs 66. In an example embodiment, the switching arrangement 82 may be further defined as a three-phase inverter bridge although other arrangements are contemplated by this disclosure.

The driver circuit 84 is interfaced with the motor switches of switching arrangement 82. The driver circuit 84 controls the state of the motor switches. In this embodiment, the driver circuit 84 is shown as being separate from the switching arrangement 82. In other embodiments, the driver circuit 84 and the switching arrangement 82 may be a single integrated circuit which may be commercially available from various manufactures. For example, the switching arrangement 82, which may include the IGBTs 66, and the driver circuit 84 may be a part of the IPM 52.

The controller 78 is interfaced with the driver circuit 84 and may generate PWM signals to control the electric motor 28. In this embodiment, the controller 78 receives power from a driver power supply 94. In an alternate embodiment, the controller 78 may receive power directly from the rectifier 44.

The driver power supply 94 is electrically connected in series with the rectifier 44 and operates to power the driver circuit 84 via the power on/off switch 32. The power on/off switch 32 is positioned between the driver power supply 94 and the driver circuit 84. In an example embodiment, the switch contact 56 of the power on/off switch 32 is positioned between the driver power supply 94 and the driver circuit 84.

When the power on/off switch 32 is switched to the on position, the driver circuit 84 receives power from the driver power supply 94. When the driver circuit 84 receives power, the driver circuit 84 is able to control the state of the motor switches and the electric motor 28 is on.

Conversely, when the power on/off switch 32 is switched to the off position, the driver circuit 84 does not receive power from the driver power supply 94. When the driver circuit 84 does not receive power, the driver circuit 84 is not able to control the state of the motor switches and the electric motor 28 is off.

As illustrated, the power on/off switch 32 is electrically connected between the rectifier 44 and the driver circuit 84. The power on/off switch 32 is positioned such that the power, conveyed from the AC power supply 92 through the switching arrangement 82, does not pass through the power on/off switch 32. Furthermore, the current being drawn by the electric motor 28 does not pass through the power on/off switch 32. The current passing through the power on/off switch 32 is the current being drawn by the driver circuit 84 and the current being drawn by the driver circuit 84 is lower than the current being drawn by the electric motor 28.

The power on/off switch 32 has a current rating that is approximately equal to the lower current being drawn by the driver circuit 84 and not the higher current being drawn by the electric motor 28. Similarly, the power on/off switch 32 has a voltage rating that is approximately equal to the lower voltage at which the driver circuit 84 operates and not the higher voltage at which the electric motor 28 operates. The power on/off switch 32 is a low current and low voltage switch. Advantageously, the power on/off switch 32 has smaller physical dimensions and generates less heat than a switch that would be required to withstand the higher current and higher voltage at which the electric motor 28 operates.

The performance of the power tool 10 may be measured using numerous performance metrics. In some countries, there may be laws or regulations that require certain metrics to be printed on a nameplate that is attached to the housing 12 of the power tool 10. For example, a law may require that the nameplate state that the power tool 10 draws up to a certain current, of 15 A for example, at a voltage of 120 V. In the United States, the law presently requires the nameplate to state an amount of current drawn by the power tool 10 (i.e. Amperes in or Amps-in). In Europe, the law presently requires the nameplate to state an amount of Watts that are input into the power tool 10 (i.e. Watts-in). It may be beneficial to state certain other performance metrics on the nameplate, for example to assist a potential user in deciding whether the power tool 10 is adequate for a particular task. One such other performance metric on the nameplate may be rotational speed.

In an example embodiment, the power tool 10 is configured to receive a maximum steady-state current of 15 Amperes from the AC power source, at a voltage of 120 Volts. In this example embodiment, the power tool 10 is configured to generate an output such that a quotient obtained by dividing the output, measured in Watts (Wout), by an input, measured in Volt-Amps (VAin), and further dividing by a capacitance of the capacitor, measured in Farads (Fd), is greater than 10,000 Wout/VAin/Fd.

In another example embodiment, the power tool 10 is configured to generate an output such that a quotient obtained by dividing the output, measured in Watts (Wout), by an input, measured in Volt-Amps (VAin), and further dividing by a capacitance of the capacitor, measured in Farads (Fd), is greater than 5,000 Wout/VAin/Fd.

A power factor (PF) of the power tool 10 may be computed by dividing an input of the power tool 10, measured in Watts (Watts-in), by a product of the amount of voltage (Volts-in) at which the power tool 10 is drawing current (Amps-in). An efficiency (Eff) of the power tool 10 may be computed by dividing the output of the power tool 10, measured in Watts (Wout), by the input of the power tool 10, measured in Watts (Win).

In an example embodiment, the power tool 10 is configured to generate an output such that a quotient obtained by dividing a product of the power factor (PF) and the efficiency (Eff) by a capacitance of the DC bus capacitors 50, measured in Farads (Fd), is greater than 5,000 PF*Eff/Fd.

In another example embodiment, the power tool 10 is configured to generate an output such that a quotient obtained by dividing the output, measured in Watts (Wout), by an input, measured in Volt-Amperes (VAin), and further dividing by a diameter of the electric motor 28, measured in meters (m), is greater than 10 Wout/VAin/m.

In another example embodiment, the power tool 10 is configured to generate an output that is greater than 1,200 continuous hot Watts out when the power tool 10 is being supplied by a 15 Ampere AC power source at 120 V.

A grip diameter of the power tool 10 may be measured in meters (m). The grip diameter for non-circular cross-sections may be the girth or circumference of the housing 12 divided by the quantity Pi, approximately 3.14159265. In an example embodiment, the power tool 10 is configured to generate an output such that a quotient obtained by dividing the output, measured in Watts (Wout), by an input, measured in Volt-Amps (VAin), and further dividing by the grip diameter, measured in meters, is greater than 10 Wout/VAin/m. In an alternate embodiment, the quotient may be greater than 8.3 Wout/VAin/m.

The grip diameter of the power tool 10 may also be measured in millimeters (mm). In an example embodiment, the power tool 10 may be configured such that a quotient obtained by dividing an input, measured in Watts (Win), by the grip diameter, measured in millimeters, is greater than 18 Win/mm. In this example embodiment, the quotient may be less than 179 Win/mm.

A volume of the power tool 10 may be measured in cubic centimeters (cc). In an example embodiment, the power tool 10 may be configured to generate an output such that a quotient obtained by dividing the output measured in Watts (Wout) by an input measured in Volt-Amps (VAin) and further dividing by the volume of the power tool 10 measured in cubic centimeters is greater than 600 Wout/VAin/cc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A power tool, comprising:
    a housing including a power interface couplable to a power source;
    a brushless direct-current (BLDC) motor disposed within the housing, the motor including a stator having a plurality of windings and a rotor rotatable relative to the stator;
    a circuit board residing in the housing;
    a switching arrangement mounted on the circuit board and having a plurality of motor switches configured as an inverter circuit, the inverter circuit being configured to receive electric power from the power source via a bus line and switchably output the electric power to the BLDC motor;
    a controller configured to control a switching operation of the inverter circuit to regulate the electric power supplied to the BLDC motor; and
    a capacitor mounted on the circuit board and electrically connected across the bus line, wherein
        the power tool is configured to generate a power output from the motor that is greater than 1200 continuous hot Watts out such that a quotient obtained by the power output measured in Watts (Wout), divided by a power input of the electric power supplied from the power source measured in Volt-Amperes (Vain), and further divided by a diameter of the motor measured in meters (m), is greater than 10 Wout/Vain/m.

2. The power tool of claim 1, wherein the power source is an alternating-current (AC) power source and the power tool further includes:
    a rectifier mounted on the circuit board and configured to receive AC power from the AC power source and output a direct current (DC) power on the bus line.

3. The power tool of claim 2, wherein the power source has a maximum steady-state current of 15 Amperes at a voltage in the range of 90 Volts to 265 Volts.

4. The power tool of claim 3, wherein the power tool is configured such that the power output measured in Watts (Wout), divided by the input power measured in Volt-Amps (Vain), and further divided by a capacitance of the capacitor measured in Farads (Fd), is greater than 5,000 Wout/Vain/Fd.

5. The power tool of claim 2, wherein the power tool is configured such that a product of a power factor (PF) of the power tool and an efficiency (Eff) of the power tool, divided by a capacitance of the capacitor measured in Farads (Fd), is greater than 5,000 PF*Eff/Fd.

6. The power tool of claim 1, wherein the housing is elongated defining a longitudinal axis and includes a grip portion, and the motor is disposed within the grip portion.

7. The power tool of claim 6, wherein the power tool is configured such that the power output measured in Watts (Wout), divided by the input power measured in Volt-Amperes (Vain), and further divided by a gripping diameter of the grip portion of the housing measured in meters (m) is greater than 8.3 Wout/Vain/m.

8. The power tool of claim 6, wherein the power tool is configured such that a power input measured in Watts (Win), divided by a gripping diameter of the grip portion of the housing measured in millimeters (mm) is greater than 18 Win/mm but less than 179 Win/mm.

9. The power tool of claim 6, wherein the capacitor has a total capacitance of about 5 pF to 20 pF.

10. The power tool of claim 1, wherein the power tool is configured such that the power output measured in Watts (Wout), divided by the input power measured in Volt-Amperes (Vain), and further divided by a volume of the power tool measured in cubic centimeters (cc) is greater than 600 Wout/Vain/cc.

* * * * *